US00RE38852E

(19) United States
(12) Reissued Patent
Quinones

(10) Patent Number: US RE38,852 E
(45) Date of Reissued Patent: Oct. 25, 2005

(54) TEAR/PUNCTURE RESISTANT SEMI-LAMINATE MATERIAL

(76) Inventor: Victor Manuel Quinones, 333 Burnet St., San Antonio, TX (US) 78202

(21) Appl. No.: 10/427,987

(22) Filed: May 2, 2003

Related U.S. Patent Documents

Reissue of:
(64) Patent No.: 6,242,371
Issued: Jun. 5, 2001
Appl. No.: 09/383,400
Filed: Aug. 26, 1999

U.S. Applications:
(63) Continuation-in-part of application No. 09/061,253, filed on Apr. 17, 1998, now Pat. No. 5,958,805.

(51) Int. Cl.[7] ..... B32B 15/00
(52) U.S. Cl. ..... 442/236; 442/237; 428/198; 428/594; 428/911
(58) Field of Search ..... 442/236, 237; 428/198, 594, 911

(56) References Cited

U.S. PATENT DOCUMENTS

| | | | | | |
|---|---|---|---|---|---|
| 2,742,388 | A | * | 4/1956 | Russell | 138/111 |
| 3,130,647 | A | * | 4/1964 | Anderson et al. | 493/193 |
| 3,715,251 | A | * | 2/1973 | Prentice | 156/62.8 |
| 4,290,912 | A | * | 9/1981 | Boerwinkle et al. | 252/389.3 |
| 4,668,566 | A | * | 5/1987 | Braun | 442/118 |
| 4,748,070 | A | * | 5/1988 | Beehler | 428/198 |
| 4,749,423 | A | * | 6/1988 | Vaalburg et al. | 156/181 |
| 5,272,023 | A | * | 12/1993 | Yamamoto et al. | 428/198 |
| 5,342,469 | A | * | 8/1994 | Bodford et al. | 156/244.22 |
| 5,424,115 | A | * | 6/1995 | Stokes | 428/198 |

FOREIGN PATENT DOCUMENTS

| | | | |
|---|---|---|---|
| CA | 639751 | * | 4/1962 |
| DE | 1490626 | * | 8/1963 |
| FR | 1307386 | * | 9/1962 |
| JP | 52-43594 | * | 5/1977 |
| JP | 60-68934 | * | 4/1985 |

OTHER PUBLICATIONS

Encyclopedia of Chemical Technology, 4th ed., vol. 17 (Kirk–Othmer, ed.), Wiley & Son, New York, 1991, pp. 303–309,336–338,366.*

Encylclopedia of Chemical Technology, 4th ed. vol. 10 (Kirk–Othmer, ed.), Wiley & Sons, New York, 1991, pp. 546–547.*

Bayliss, D.A. and Chandler, K.A., Steelwork Corrosion Control, Elsevier, New York, 1991, pp. 318–320.*

Corrosion, vol. 2 (Sheir, L.L. and Jarman, R.A., eds.), Butterworth Heinemann,. 1994, pp. 17:6–17:9.*

* cited by examiner

*Primary Examiner*—Elizabeth M. Cole
(74) *Attorney, Agent, or Firm*—Richard C. Litman

(57) ABSTRACT

A tear/puncture resistant semi-laminate material having a first layer of a flexible sheet of thermoplastic material and a second layer of a water impermeable thermoplastic material impregnated with a volatile corrosion inhibitor. The layers are not bonded with a uniform layer of adhesive, but are semi-laminated by bonding at points or in strips at the edges of the respective layers or at discrete, discontinuous intervals across the width of the material. In the preferred embodiments, the first layer is a tear resistant layer, which may be a layer of woven fibers, a nonwoven layer of spunbonded fibers, or a tear resistant film. In an alternative embodiment, polypropylene is substituted for polyethylene in the first and second layers.

15 Claims, 2 Drawing Sheets

TEAR/PUNCTURE RESISTANT SEMI-LAMINATE MATERIAL

Matter enclosed in heavy brackets [ ] appears in the original patent but forms no part of this reissue specification; matter printed in italics indicates the additions made by reissue.

CROSS-REFERENCES TO RELATED APPLICATIONS

This is a continuation-in-part of my prior application Ser. No. 09/061,253, filed Apr. 17, 1998, now U.S. Pat. No. 5,958,805.

BACKGROUND OF THE INVENTION

1. FIELD OF THE INVENTION

The present invention relates to material which may be used to wrap rolls or sheets of metal that is both tear and puncture resistant, and particularly to laminated thermoplastic materials.

2. DESCRIPTION OF THE RELATED ART

Various materials have been made with combined layers of material so that the final product exhibits the properties of both layers. No materials exist, however, possessing the unique properties of the present invention, including tear resistance, puncture resistance and corrosion inhibitors.

U.S. Pat. No. 2,742,388 issued Apr. 17, 1956 to A. W. Russell discloses a method of bonding and curing two or more plastic sheets to provide enough rigidity for use as structural members. The cellophane strip longitudinally between the edges to form a pocket in which a shaping tool may be inserted with the application of heat to soften and shape the fibers.

U.S. Pat. No. 3,130,647 issued Apr. 28, 1964 to W. E. Anderson, et al. describes a method of bonding a resilient or fragile layer to a relatively nonresilient layer, such as paper, by heat bonding with the application of pressure. U.S. Pat. No. 3,715,251 issued Feb. 6, 1973 to J. S. Prentice teaches lamination of nonwoven mats of thermoplastic fibers by adhesives or point welding to produce a laminated nonwoven sheet of material.

U.S. Pat. No. 4,668,566 issued May 26, 1987 to Ralph V. Braun discloses a multilayer material comprising a layer of polyethylene bonded to a layer of polypropylene to form a nonwoven fabric. U.S. Pat. No. 4,748,070 issued May 31, 1988 to David C. Beehler teaches a polypropylene web bonded to a polypropylene film to increase the tear strength of the film. U.S. Pat. No. 4,749,423 issued Jun. 7, 1988 to Vaalburg, et al. describes a method of bonding a nonwoven web of thermoplastic fibers.

U.S. Pat. No. 5,272,023 issued Dec. 21, 1993 to Yamamoto, et al. describes a method of making a hot melt adhesive fiber sheet. U.S. Pat. No. 5,342,469 issued Aug. 30, 1994 to Bodford, et al. discloses a method of laminating a spunbond web of polyethylene fiber to a film using adhesive in which the adhesive layer is discontinuous. U.S. Pat. No. 5,424,115 issued Jun. 13, 1995 to Ty J. Stokes teaches a method of point bonding sheets of conjugate fibers such as polyolefin and polyamide fibers.

Canadian Patent No. 639,751 published Apr. 10, 1962 teaches a method of spot welding polyethylene film sheets. French Patent 1,307,386 published Sep. 17, 1962 describes methods of bonding sheets of plastic materials. German Patent 1,490,626 issued Aug. 13, 1963 describes an insulating paper for high tension wires bonded by spot adhesives. Japanese Patent 52-43594 describes bonding paper or cloth to a polypropylene base by adhesives. Japanese Patent 60-68934 describes a waterproof laminate composed of three layers, the second being polyurethane.

U.S. Pat. No. 4,290,912, issued Sep. 22, 1981 to Boerwinkle, et al., describes an article having volatile corrosion inhibiting properties, the article being a polyolefin polymer to which a mixture of an inorganic nitrite salt, a 2,4,6-trisubstituted phenol containing 9 to 24 carbon atoms, and fumed silica is added. The use of volatile corrosion inhibitors in packaging materials and to protect steel from corrosion is discussed in Corrosion, Vol. 2 (Sheir, L. L. and Jarman, R. A., eds.), published by Butterworth Heinemann in 1994, pp. 17:6 to 17:9, and in Steelwork Corrosion Control, D. A. Bayliss and K. A. Chandler, published by Elsevier in 1991, pp. 318–320.

Various methods of forming nonwoven fabrics generally, are discussed in Kirk-Othmer, Encyclopedia of Chemical Technology, Vol. 10, pp. 546–47. A further description of forming nonwoven, spunbonded plastic fabrics is disclosed in Kirk-Othmer, Encyclopedia of Chemical Technology, Vol. 17, pp. 303–309 and 336–338, and their use as packaging for steel and aluminum coils is particularly disclosed at p. 366.

None of the above inventions and patents, taken either singularly or in combination, is seen to describe the instant invention as claimed. None of the above inventions and patents describe a material combining tear and puncture resistance with corrosion inhibition suitable for wrapping rolls or sheets of metals such as steel and aluminum. Thus a tear/puncture resistant semi-laminate material solving the aforementioned problems is desired.

SUMMARY OF THE INVENTION

In steel mills it is useful to wrap or separate rolls or sheets of steel for protection during storage or transport. Currently the material used is composed of a layer of woven polyethylene bonded to a 1 mil extrusion of film and a reinforcing ply of kraft paper. When tears or punctures develop, the kraft paper tends to absorb water, and consequently the steel can become corroded.

Further, the material currently used is prepared by extruding the film over the layer of woven polyethylene and heat bonding the layers by processing the combined layers through the nip of rollers under pressure to produce a material uniformly bonded throughout its length and width. By uniformly bonding the two layers of material together, the material loses some of its elasticity.

As described in the original application, the material of the present represents an improvement in the materials currently available in the steel packaging industry, comprising a layer of woven high density polyethylene, bonded at points or in strips around its edges or at discrete, discontinuous intervals across its width to a layer of low density polyethylene film to form sheets 60" to 120" wide. The layer of polyethylene film is impregnated with a volatile corrosion inhibitor. Alternatively, the layers may be made from polypropylene.

The layer of woven, high density polyethylene or woven polypropylene was selected for its strength and tear resistance, which are particularly suitable for wrapping large rolls or coils of steel, aluminum, and other metals. However, it has been determined that other forms of polyethylene and polypropylene also provide sufficient strength and tear resistance to be useful for the packaging of rolls of steel or aluminum coils.

It has also been realized that the primary site subject to tearing in the packaging of large rolls of steel, aluminum, and other metals is located over the circumference of the coil, the core of the coil not being exposed to damage from tearing. Therefore, a considerable economy of costs may be achieved by making the two layers of material in different sizes, as by making the tear resistant layer just large enough to fit over the circumference of the coil, the second layer being large enough to cover the entire coil, including both the entire width of the coil between the opposing edges and the core of the coil. Alternatively, the film, or water impermeable layer may be made smaller than the tear resistant layer.

Finally, it will be understood that the description of the semi-laminate material as being formed in sheets 60" to 120" wide is by way of illustration and not by way of limitation. The sheets may be formed in any desired width, including widths over 120".

Accordingly, it is a principal object of the invention to provide a tear and puncture resistant material for wrapping metals for storage or transport having improved moisture protection by layering sheets so that a tear or puncture in one layer does not necessarily extend to another layer.

It is another object of the invention to provide a tear and puncture resistant material for wrapping metals for storage or transport having greater elasticity than materials currently used in the industry by providing a material produced using a method of lamination in which the properties of one layer are not affected by the properties of another layer or by the process of lamination itself.

It is a further object of the invention to provide a material which is tear and puncture resistant and which also inhibits corrosion by using a material having a layer impregnated with a corrosion inhibitor.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawing.

DETAILED DESCRIPTION OF THE PREFERRED EMBODIMENTS

The present invention relates to a material which is tear and puncture resistant, having sufficient strength and elasticity to prove useful in the metals industry, where it may be used for wrapping rolls or sheets of steel, aluminum, and other newly milled metals to provide protection from the weather during storage and transport.

The material of the present invention is fabricated from polymeric materials, specifically, thermoplastic films and fibers. In the preferred embodiments, the layers of the material are composed entirely of polyethylene fibers and films, or entirely from polypropylene fibers and films. Polyethylene and polypropylene are considered desirable for this application because among their many other properties, they are recyclable, which is why layers of polyethylene and polypropylene are not mixed.

Figure 1:
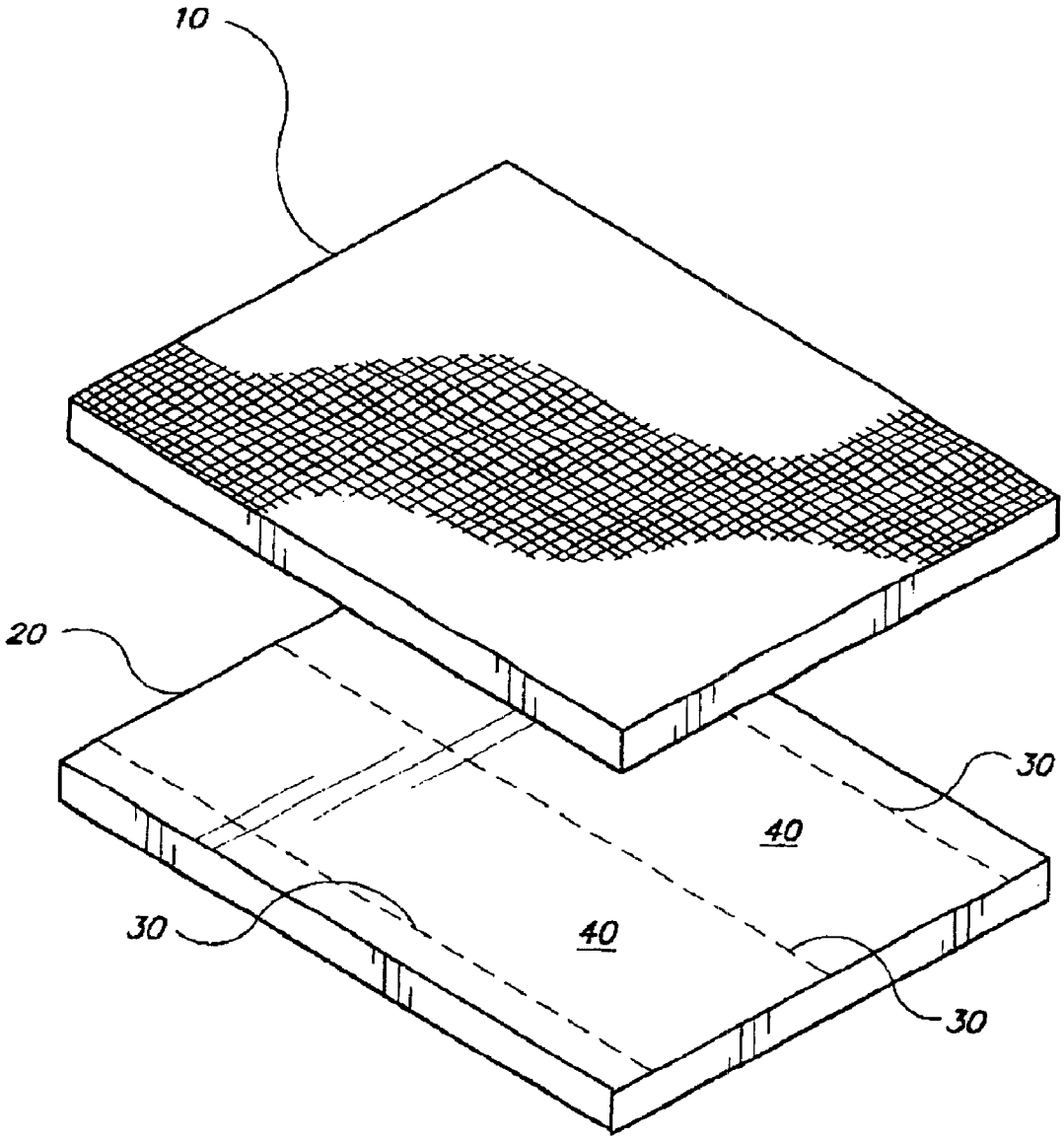
FIG. 1 is an diagrammatic, perspective view of a tear/puncture resistant semi-laminate material according to the present invention with the layers separated to show the bonding of the layers.

In the preferred embodiment, as shown in FIG. 1, the invention comprises a material having two layers, each layer being a flexible sheet of thermoplastic material. The top layer 10 is a layer of woven high density polyethylene fibers having a thickness between 3 mils and 7 mils, preferably 5 mils. This layer provides multi-directional strength, i.e., tear resistance in both the machine direction and the cross direction. Fibers running in the machine and cross directions, which may be in the ratio of about 8:4 lines per square inch, provide this multi-directional strength. The woven polyethylene imparts ease of handling to the material.

While the layer of woven polyethylene 10 imparts significant benefits to the material, nevertheless, it is subject to breakage, viz., when great tensile forces are applied to it. Therefore, the second layer 20 is a layer of extruded, nonwoven, low density polyethylene film having a thickness between 1 mil and 6 mils, preferably 3 mils. The layer of polyethylene film 20 gives the material puncture resistance. The polyethylene film is water impermeable, providing protection against water and moisture.

The layer of polyethylene film 20 is impregnated with a volatile corrosion inhibitor, which may be sodium nitrite, for example. Steel and other metals are subject to corrosion from exposure to the weather, undergoing oxidation in the presence of water. A variety of methods are used to protect metals from corrosion, such as electroplating, paint, etc. One of the methods used to help prevent corrosion is the use of volatile corrosion inhibitors, also known in the art as vapor phase inhibitors, such as nitrites. While the exact mechanism by which volatile corrosion inhibitors act to inhibit corrosion is the subject of some disagreement, they are known to work and are widely used in the packaging industry.

In the preferred embodiment of the present invention, sodium nitrite is used as the volatile corrosion inhibitor. The sodium nitrite is combined with the polyethylene in the melt and extruded in the polyethylene film. Other volatile corrosion inhibitors are well known in the metals industry and may be used in place of sodium nitrite.

The method of bonding used to laminate the two layers is referred to as semi-lamination. Normally materials to be laminated are coated uniformly throughout their surface with an adhesive or thermosetting resin, or one layer is extruded over a second layer and the layers are bonded by heat and pressure. By contrast, the material of the present invention is bonded by point welding, by heat bonding, by ultrasonic bonding, by adhesive bonding, or other appropriate conventional methods of bonding standard in the industry, in narrow continuous strips 30 applied to the edges of the layer, and optionally at discrete, discontinuous intervals across the width of the layers, as shown in the figure, defining spaces 40 or pockets.

The process of semi-lamination offers several advantages. Since the layers are not uniformly bonded, the vast majority of the surface area of the two layers is in slidable contact so that the layers tend to slide in relation to each other as the material is wrapped around the metal, so that if a hole develops in the woven layer, in all likelihood it will not have a hole at the same position in the second layer. Hence, any moisture entering through the hole in the first layer tends to be trapped in the spaces 40 or pockets between the layers. Since the polyethylene film is impermeable to water, the metals are protected from exposure to water, unlike materials currently used which employ a reinforcing ply of kraft paper which tends to absorb any water entering through a hole in the top layer. This method of lamination permits the finished material to retain the beneficial properties of the material in each individual layer while enjoying the advantages of combining the layers.

The basis weight of the finished material is approximately 25 lbs. per 1000 square feet. In operation, the metal is wrapped in the material with the second layer closest to the metal. In this manner the metals derive the greatest degree of protection from the layer containing the volatile corrosion inhibitor.

While the above embodiment, describes a preferred embodiment of the invention, other forms of polyethylene may be used. Woven, high density polyethylene is preferred to impart strength and tear resistance to the first layer 10. However, forms of polyethylene other than woven fibers of high density polyethylene may have sufficient strength to be used in the first layer.

For example, another form of polyethylene sheet which may be used for the first layer 10 is a fabric of nonwoven fibers which are spunbonded or meltblown. In this type of sheet, the fibers are not woven, but bonded together in a planar network by chemical, mechanical, or solvent means. The fibers may be completely isotropic, or they may be aligned in the machine and cross directions. Such spunbonded sheets have previously been used in packaging, and particularly in wrapping coils of steel and aluminum, as the tear resistant and puncture resistant properties of spunbonded fabrics outperform films and papers. They have not, however, been previously used as a component of the semi-laminated material described therein.

Another form of polyethylene sheet which may be used for the first layer 10 is a polyethylene film which has been processed for increased strength and tear resistance. This may be accomplished by coextruding two layers of film, one in the machine direction and one in the cross direction, either by extruding them together through a single die or pressing them together in a cooling tank during the extrusion process. It has been found that such film has greater tear resistance than film extruded in a single direction, presumably due to the orientation of the molecules.

In either the woven form, the spunbonded form, or in the form of film extruded in both the machine and cross directions, the first layer 10 has greater tear resistance than the second layer 20 by virtue of the process by which the first layer is formed. Consequently, while the first layer 10 is preferably formed from high density polyethylene due to its greater tensile strength, the first layer 10 may be made from low density polyethylene and still have greater strength than the second layer 20.

Finally, the first layer 10 may be made from any plastic sheet material, whether fiber or film, woven or nonwoven, single layer or multilayer laminate, high density or low density polyethylene. Even if the first layer 10 does not have greater tear resistance, the semi-laminate material still has useful advantages over a single layer material or a multilayer material laminated according to the methods of the prior art. The essence of the invention resides in the process of semi-lamination, so that the layers are not uniformly bonded, the vast majority of the surface area of the two layers being in slidable contact so that the layers tend to slide in relation to each other as the material is wrapped around the metal, so that if a hole develops in the first layer 10, in all likelihood it will not have a hole at the same position in the second layer 20, the second layer 20 being water impermeable and impregnated with a volatile corrosion inhibitor to protect the coil from the corrosive effects of moisture.

It will further be noted that the second layer 20 need not be film, but may be any sheet of water impermeable polyethylene impregnated with a volatile corrosion inhibitor. For example, the second layer 20 may be a water impermeable layer of spunbonded polyethylene fibers. Spunbonded nonwovens are thin and almost film-like in appearance. The spunbonded sheet may be coated to improve its water resistant property by a variety of known processes, including an extrusion film coating of polyethylene.

The embodiment described above is composed entirely from layers of polyethylene. It will be understood that alternative embodiments may be made entirely from polypropylene, comprising a first layer 10 and a second layer of polypropylene impregnated with a volatile corrosion inhibitor, within the specifications set forth above for polyethylene. The advantage of using polyethylene, particularly high density polyethylene, or polypropylene, is that these materials are recyclable.

Figure 2:
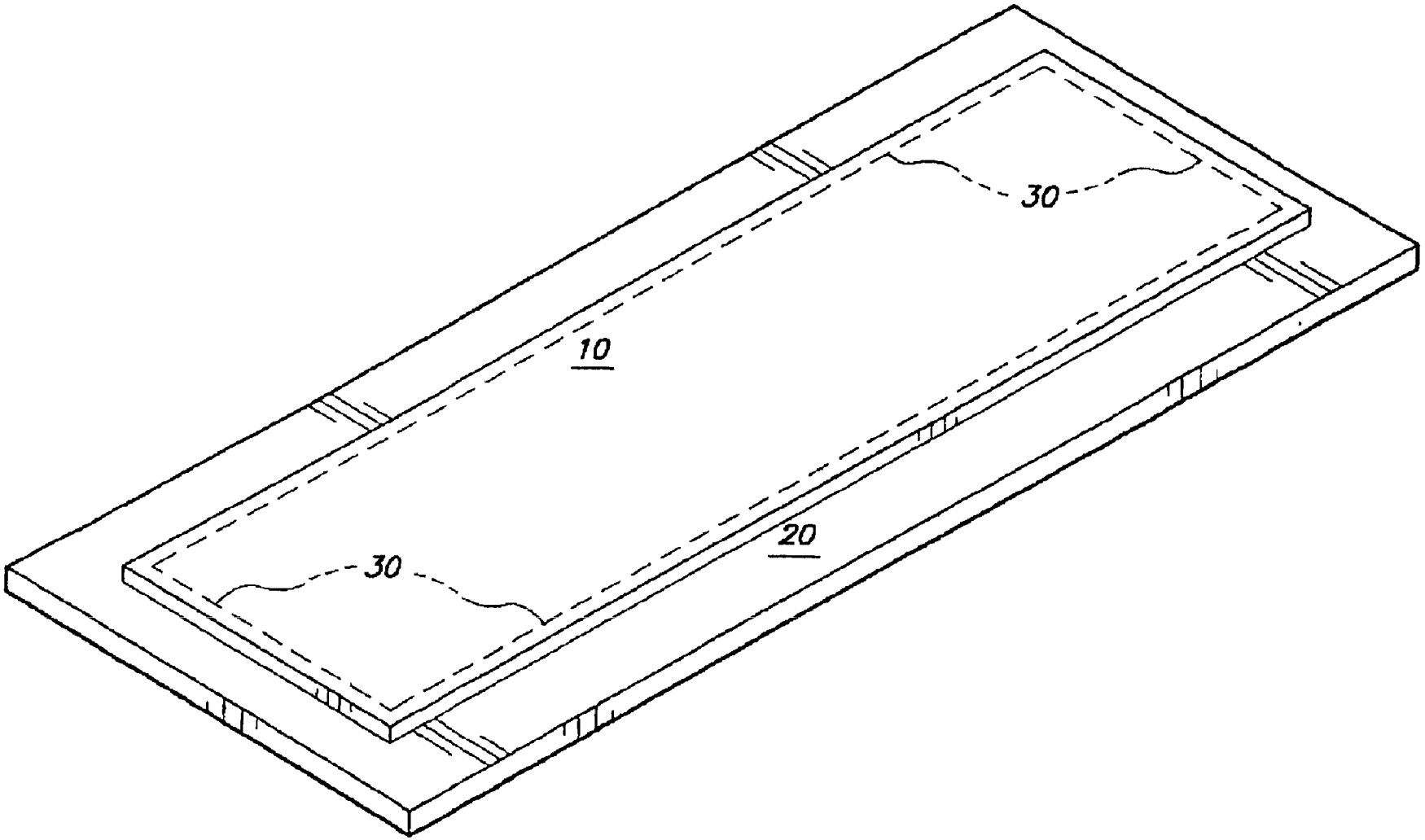
FIG. 2 is a diagrammatic, perspective view, of an alternative embodiment of tear/puncture resistant semi-laminate material according to the present invention, the bonding strips being represented in phantom.

It has also been realized that the primary site subject to tearing in the packaging of large rolls of steel, aluminum, and other metals is located about the circumference of the coil, the core of the coil not being exposed to the same risk of tearing. Therefore, a considerable economy of costs may be achieved by making the two layers of material in different sizes, as by making the first, tear resistant layer 10 in a rectangular strip extending longitudinally along the longitudinal center line of the second layer 20, with a surface just wide enough to fit across the circumference of the coil, the second layer 20 being wide enough to cover a substantially greater surface area of the coil, including the core of the coil on opposite sides of the first layer 10, the two layers 10 and 20 being joined by bonding strips 30 about the periphery of the smaller first layer 10, as shown diagrammatically in FIG. 2, and optionally at discrete points or intervals across the width of the first layer 10, in accordance with the semi-laminating method described above. Alternatively, the second, water impermeable layer 20 may be made with a smaller surface area than the first layer 10, the drawing being identical to FIG. 2 with the reference numbers 10 and 20 being switched. Yet another alternative (not shown) would be to make the first, tear resistant layer 10 just large enough to cover the core of the coil. Although the two layers 10 and 20 are shown as being rectangular in the drawings, it will be obvious that the sheets comprising the first 10 and second 20 layers may have any desired shape (square, circular, etc.).

It is to be understood that the present invention is not limited to the embodiments described above, but encompasses any and all embodiments within the scope of the following claims.

I claim:

1. A tear/puncture resistant semi-laminate material, comprising:

(i) a first layer, being a flexible sheet of thermoplastic material; and (ii) a second layer, being a flexible sheet of a water impermeable, puncture resistant thermoplastic material impregnated with a volatile corrosion inhibitor;

wherein [the] said layers are bonded together by bonding in narrow strips at [the] edges of the respective layers [and at discrete, discontinuous intervals across the width of said layers].

2. The tear/puncture resistant semi-laminate material according to claim 1, wherein:

(i) said first layer consists essentially of a tear resistant sheet of polyethylene; and (ii) said second layer consists essentially of a water impermeable sheet of polyethylene impregnated with a volatile corrosion inhibitor.

3. The tear/puncture resistant semi-laminate material according to claim 1, wherein:

(i) said first layer consists essentially of woven, high density polyethylene fibers; and (ii) said second layer consists essentially of low density polyethylene film impregnated with a volatile corrosion inhibitor.

4. The tear/puncture resistant semi-laminate material according to claim 1, wherein:

(i) said first layer consists essentially of nonwoven, spunbonded polyethylene fibers; and (ii) said second layer consists essentially of polyethylene film impregnated with a volatile corrosion inhibitor.

5. The tear/puncture resistant semi-laminate material according to claim 1, wherein:

(i) said first layer consists essentially of a tear resistant sheet of polyethylene film; and (ii) said second layer consists essentially of polyethylene film impregnated with a volatile corrosion inhibitor.

6. The tear/puncture resistant semi-laminate material according to claim 1, wherein:

(i) said first layer consists essentially of polyethylene film; and (ii) said second layer consists essentially of polyethylene film impregnated with a volatile corrosion inhibitor.

7. The tear/puncture resistant semi-laminate material according to claim 1, wherein:

(i) said first layer consists essentially of a tear resistant sheet of polypropylene; and (ii) said second layer consists essentially of a water impermeable sheet of polypropylene impregnated with a volatile corrosion inhibitor.

8. The tear/puncture resistant semi-laminate material according to claim 1, wherein:

(i) said first layer consists essentially of woven, polypropylene fibers; and (ii) said second layer consists essentially of low density polypropylene film impregnated with a volatile corrosion inhibitor.

9. The tear/puncture resistant semi-laminate material according to claim 1, wherein:

(i) said first layer consists essentially of nonwoven, spunbonded polypropylene fibers; and (ii) said second layer consists essentially of polypropylene film impregnated with a volatile corrosion inhibitor.

10. The tear/puncture resistant semi-laminate material according to claim 1, wherein:

(i) said first layer consists essentially of a tear resistant sheet of polypropylene film; and (ii) said second layer consists essentially of polypropylene film impregnated with a volatile corrosion inhibitor.

11. The tear/puncture resistant semi-laminate material according to claim 1, wherein:

(i) said first layer consists essentially of polypropylene film; and (ii) said second layer consists essentially of polypropylene film impregnated with a volatile corrosion inhibitor.

12. The tear/puncture resistant semi-laminate material according to claim 1, wherein the volatile corrosion inhibitor impregnated in said second layer comprises sodium nitrite.

13. The tear/puncture resistant semi-laminate material according to claim 1, wherein said first layer has a smaller surface area than said second layer, said first layer being bonded to said second layer about the periphery of said first layer.

14. The tear/puncture resistant semi-laminate material according to claim 1, wherein said second layer has a smaller surface area than said first layer, said second layer being bonded to said first layer about the periphery of said second layer.

*15. The tear/puncture resistant semi-laminate material according to claim 1, wherein said layers are further bonded together in narrow strips at discrete discontinuous intervals across the width of said layers.*

* * * * *